United States Patent [19]

Taylor

[11] Patent Number: 4,690,094

[45] Date of Patent: Sep. 1, 1987

[54] BOAT WITH CHANGEABLE CONFIGURATION HULL

[76] Inventor: James F. Taylor, 4217 Laurel Ridge Dr., Raleigh, N.C. 27612

[21] Appl. No.: 845,939

[22] Filed: Mar. 31, 1986

[51] Int. Cl.⁴ .................................................. B63B 1/22
[52] U.S. Cl. .................................... 114/284; 114/271; 248/642
[58] Field of Search ............... 114/284, 271, 56, 57, 114/123, 275, 277, 283, 285, 286; 440/53, 84, 87; 248/641, 642

[56] References Cited

U.S. PATENT DOCUMENTS

| | | | |
|---|---|---|---|
| Re. 31,563 | 4/1984 | Stout et al. ......................... | 114/283 |
| 2,438,493 | 3/1948 | Berger ................................ | 114/283 |
| 2,718,368 | 9/1955 | Doolittle .......................... | 114/284 X |
| 3,075,490 | 1/1963 | Lang ................................. | 248/642 X |
| 4,320,713 | 3/1982 | Nishida et al. ..................... | 114/123 |

Primary Examiner—Jeffrey V. Nase
Assistant Examiner—Paul E. Salmon
Attorney, Agent, or Firm—Mills & Coats

[57] ABSTRACT

A planing boat is provided having a variable configuration hull including two side panels hingedly secured to opposite sides of a keel panel. When the boat is sitting still in the water or moving at relatively slow speeds, the side panels extend generally outwardly from the keel panel providing the boat with a degree of stability. As the speed of the boat increases, and upon attaining dynamic stability, the side panels pivot upwardly thereby reducing the effect of impact on the water. When the speed of the boat decreases, the side panels return to their normal outwardly extending position.

18 Claims, 5 Drawing Figures

BOAT WITH CHANGEABLE CONFIGURATION HULL

FIELD OF INVENTION

The present invention relates generally to planing boats and more particularly to planing boats having a variable configuration hull.

BACKGROUND OF INVENTION

As a planing type boat moves along the surface of a body of water, it becomes increasingly susceptible to overturning or damage by impact with even minor waves as the speed of the boat increases. Therefore, it is desirable to reduce the effect of impact on the water by the hull of the boat. The present invention proposes to reduce the effects of impact on the water by varying the configuration of the hull as the speed of the boat increases.

There have been devised boats that have a variable configuration hull. One such boat is shown in the patent to Anderson, U.S. Pat. No. 4,458,622, issued on July 10, 1984. The patent to Anderson discloses a displacement hull designed for low resistance at relatively low speeds, and includes an aft section having a pair of services displaceable to a position and added to such that at higher speeds, the hull gives lift to the stern to facilitate a planing action. The displaceable portions of the hull may be in the form of plates but are more preferably solid bodies which fit into recesses in the hull that can be extended when needed.

While the patent to Anderson teaches a hull having displaceable portions, the basic configuration of the hull remains the same. No prior art teaches a hull which changes its basic configuration entirely. Moreover, no prior art teaches a hull which changes configuration in response to the increased speed of the boat.

SUMMARY AND OBJECTS OF INVENTION

The present invention provides a planing boat whose hull changes its basic configuration in response to the increased speed of the boat. The hull includes two side panels hingedly secured to opposite sides of an elongated keel panel. A motor is mounted on a plate which is pivotively secured to the keel panel. A pair of connecting arms extends from the plate to opposite side panels.

When the boat is sitting still or moving at relatively slow speeds, the side panels extend generally outwardly from the keel panel. As the speed of the boat increases, the motor and plate begin to pivot due to the thrust of the motor, which tends to pull the side panels upwardly. As the speed of the boat decreases, a tension spring secured to the plate urges the motor back to its original position causing the side panels to also return to their outwardly extending position.

Accordingly, it is an object of the present invention to provide a boat hull design which changes configuration depending upon the relative speed of the boat.

Another object of the present invention is to provide a boat hull design which reduces the effect of impact with the water.

Another object of the present invention is to provide a boat hull design that lessens the effect of wind on the underside of the hull as the boat planes across the surface of the water.

Another object of the present invention is to provide a boat hull design which facilitates the planing action of the boat.

Another object of the present invention is to provide a boat hull design wherein the hull varies configuration in response to the bodily rotation of the motor.

Another object of the present invention is to provide a boat hull design which has lighter weight construction.

Other objects and advantages of the present invention will become apparent from a study of the following description and the accompanying drawings which are merely illustrative of such invention.

BRIEF DESCRIPTION OF INVENTION

DETAILED DESCRIPTION OF THE INVENTION

Figure 1:
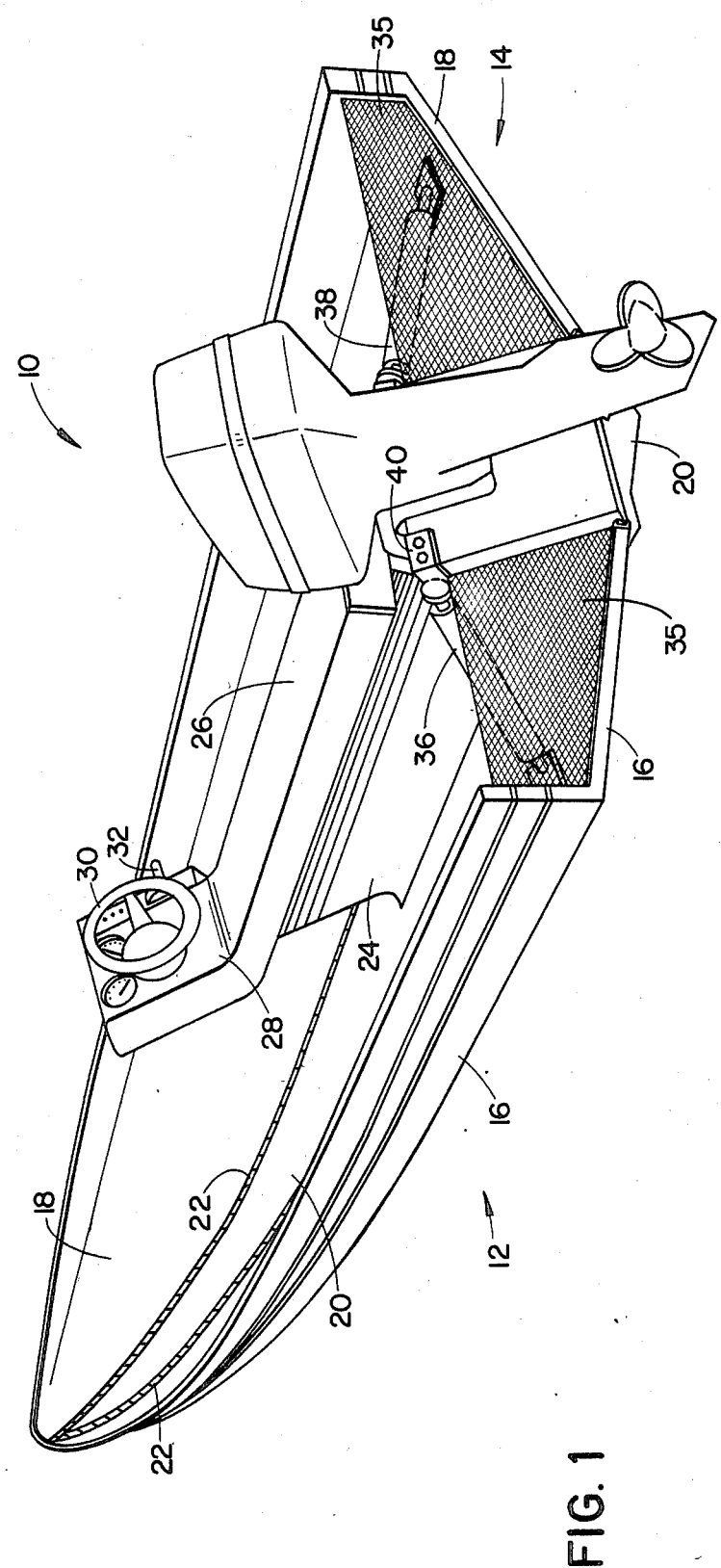
FIG. 1 is a perspective view of the boat of the present invention having a changeable configuration hull.

Referring now to the drawings, the boat with a variable configuration hull is shown therein and indicated generally by the numeral 10. Viewing boat 10 in more detail it is seen that the same includes variable volume primary boat hull structure indicated generally at 12 and a hull configuration control means indicated generally at 14.

Boat hull structure 12 includes a pair of side panels 16 and 18 secured to opposite sides of a central keel panel 20 by water tight hinges 22. Side panel 16 and 18 are moveable relative to keel panel 20 as can be clearly seen in FIGS. 4 and FIGS. 5. In FIG. 5, the hull structure is shown in what is referred to as the expanded position. In this configuration, the side panels 16 and 18 extend generally outwardly from keel panel 20.

Figure 4:
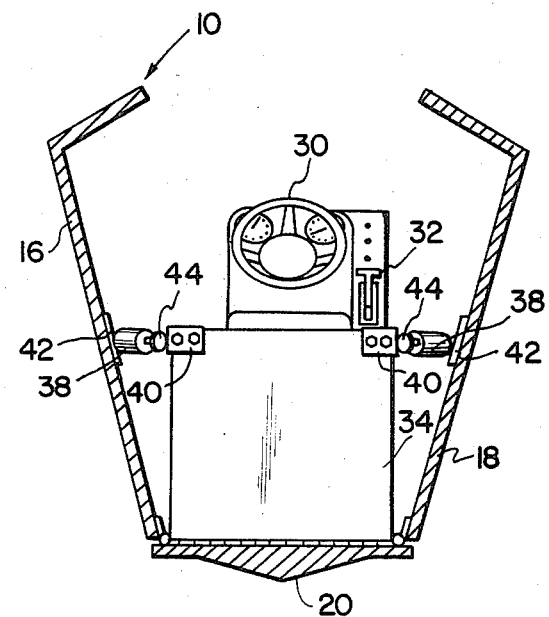
FIG. 4 is a transverse cross section illustrating the position of the side panels in the planing hull configuration.
Figure 5:
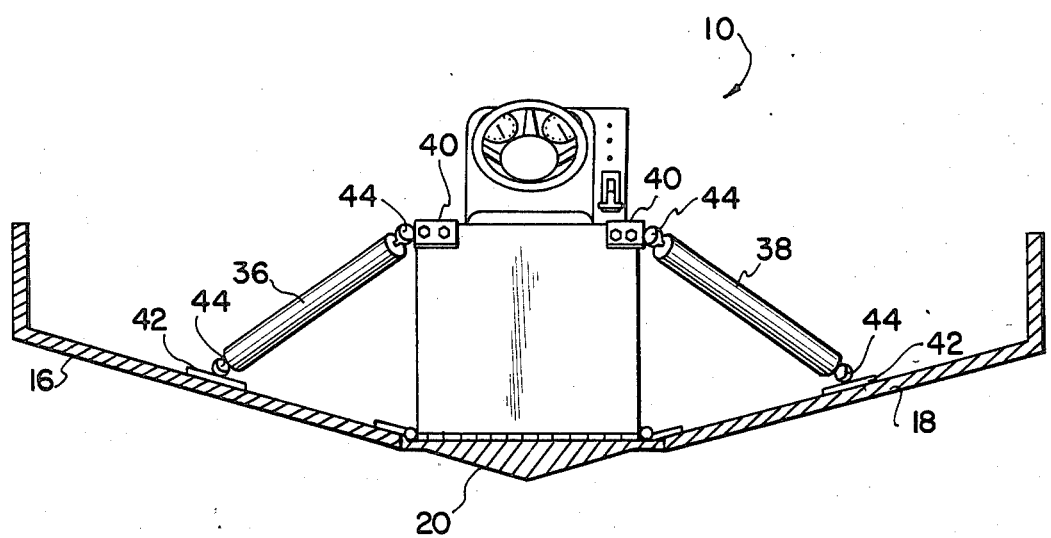
FIG. 5 is a transverse cross section illustrating the position of the side panels in the stable hull configuration.

In FIG. 4, hull structure 12 is illustrated in what is referred to as the retracted position. In this configuration, the side panels 16 and 18 are pulled upwardly with respect to keel panel 20 so that the boat can plane across the surface of the water on keel panel 20.

A seat support structure 24 extends upwardly from the rear portion of keel panel 20. An elongated seat 26 is mounted on top of seat support structure 24. A control panel 28 extends upwardly at an angle about the forward end of seat 26. Control panel 28 includes means for controlling the speed and direction of boat 10 such as a steering wheel 30 and throttle control 32. Appropriate instruments such as a tachometer/speedometer may also be included. The control panel 28, seat 26 and seat support structure 24 are preferably integrally formed with each other and with keel panel 20.

Figure 2:
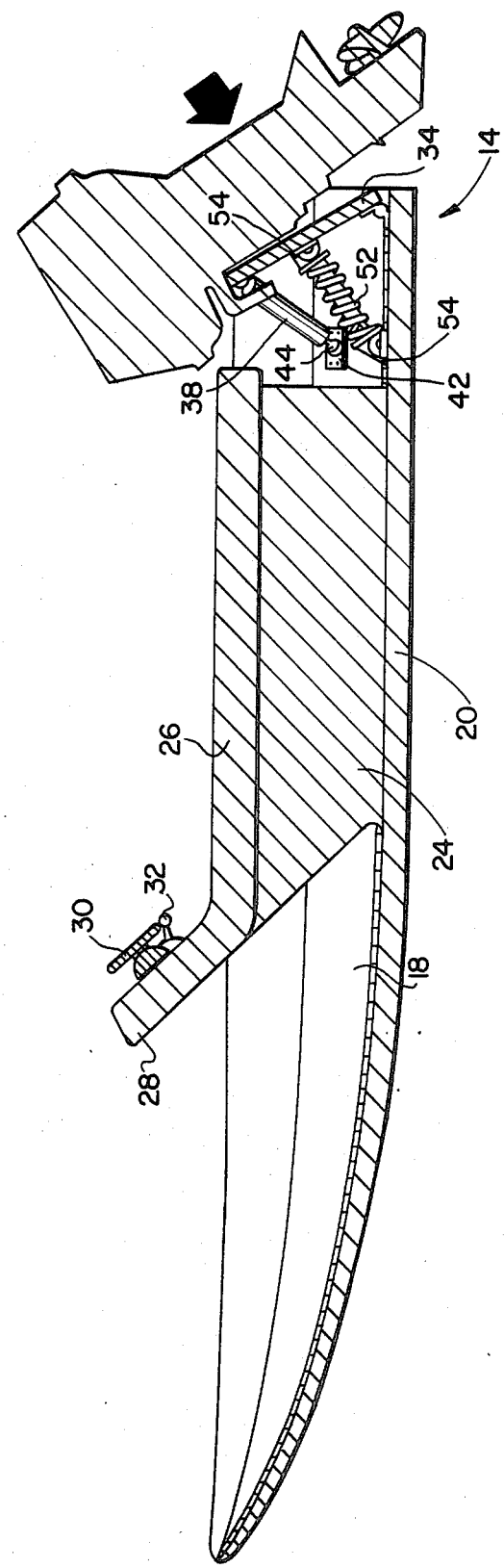
FIG. 2 is a longitudinal cross-section of the boat with a changeable configuration hull illustrating the position of the motor in a stable hull configuration.
Figure 3:
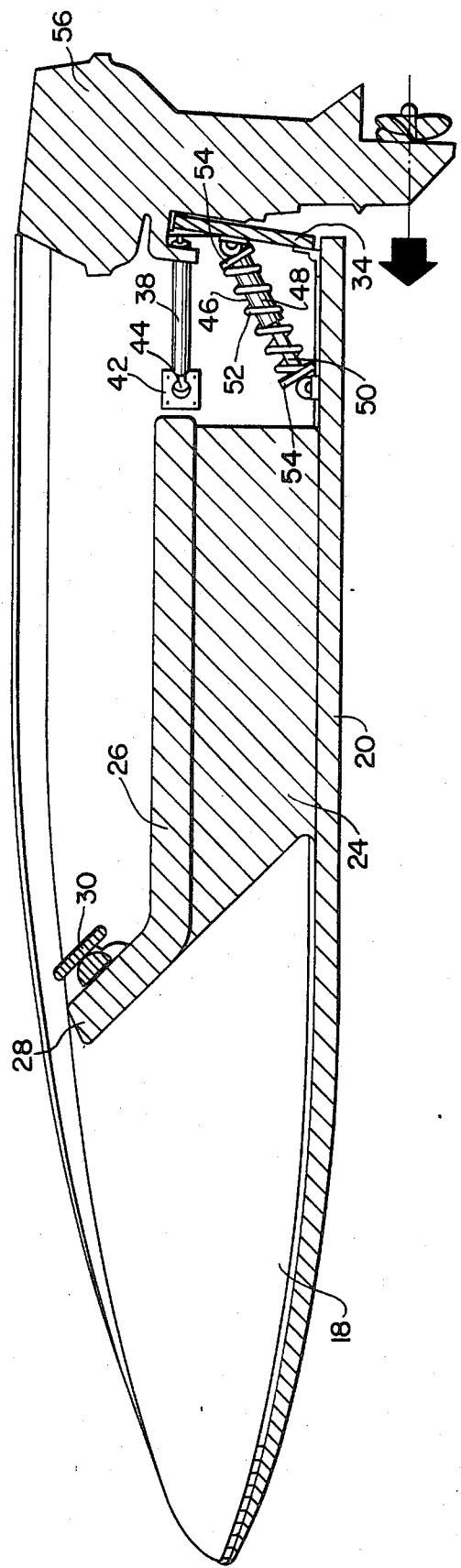
FIG. 3 is a longitudinal cross-section of the boat with a changeable configuration hull illustrating the position of the motor in the planing hull configuration.

Referring now to FIGS. 2 and 3, the hull configuration control means 14 is illustrated. Hull configuration control means 14 includes a motor mount 34 which is pivotally secured along its lower edge to the stern end of keel panel 20. Mount 34 is moveable between a first position shown in FIG. 2 and a second position shown in FIG. 3.

A pair of connecting arms 36 and 38 interconnect mounting plate 34 with side panel 16 and 18. Connecting arms 36 and 38 are secured at one end to mount 34 by a bracket 40 and at the opposite end to respective side panels 16 and 18 by a securing plate 42 (FIGS. 4 and 5). Each connecting arm 36 and 38 includes a pair of ball joints 44 at each end thereof to permit universal pivotal movement of the connecting arms 36 and 38 with respect to both the mount 34 and side panels 16 and 18. It is appreciated therefore that as the mount 34 moves from the first position shown in FIG. 2 to the second position shown in FIG. 3, the connecting arms 36 and 38 will pull the corresponding side panels 16 and 18 upwardly into a retracted position. As the mount 34 moves back to the first position the side panels 16 and 18 will be pushed back down into an expanded position.

Mount 34 is biased to the first position as shown in FIG. 2. A hydraulic dampener 46 is pivotally connected at its respective ends to the mount 34 and keel panel 20. Hydraulic dampener 46 includes a piston cylinder 48 and a piston rod 50 extending outwardly therefrom as can clearly be seen in FIG. 3. A tension coil spring 52 is disposed about hydraulic dampener 46 and is fixedly secured to opposite ends thereof by a pair of end plates 54, one of which is attached to cylinder 48 and one of which is attached to rod 50. The tension coil spring 52 tends to compress hydraulic dampener 46 effectively biasing mount 34 to the first position shown in FIG. 2.

A pair of waterproof fabric partitions 35 are secured to opposite sides of mount 34 and to respective side panels 16 and 18 to enclose the open end of the hull structure 12 as can be clearly seen in FIG. 1.

An outboard motor 56 is mounted to motor mount 34 in the conventional manner. Steering wheel 30 and throttle control 32 are operatively connected to motor 56. When motor 56 is actuated and the propellor thereof is engaged, boat 10 will be propelled along through the water. The propelling force or thrust generated by motor 56 acts in the direction of the arrows shown in FIGS. 2 and 3. It is appreciated therefore that the actuation of motor 56 will cause the mount 34 to pivot from the forwardly extending position (FIG. 2) to the vertically extending position shown in FIG. 3. The degree of rotation of mount 34 will depend of course upon the power output of motor 56. Thus, mount 34 will rotate gradually from the first position (FIG. 2) to the second position (FIG. 3) as the power output of motor 56 increases. As the power to motor 56 is decreased, the mount 34 will of course rotate back towards the first position (FIG. 2).

Since the side panels 16 and 18 are operatively connected to mount 34 by connecting rods 36 and 38, the side panels 16 and 18 will be pulled upwardly as the power output of motor 56 increases and will be pushed back downwardly as the power output of motor 56 decreases. Therefore it is appreciated that as the speed of the boat increases the panels 16 and 18 are pulled upwardly out of the water. As the speed of the boat decreases, the panels 16 and 18 move downwardly toward the underlying water.

The movement of side panels 16 and 18 allows the boat hull structure 12 to assume an expanded position when the boat 10 is sitting still or moving at relatively slow speeds. Thus boat 10 will be relatively stable. At higher speeds where dynamic stability is attained, the side panels are pulled upwardly into the retracted position allowing boat 10 to plane across the surface of the water on keel panel 20. This allows the boat to achieve greater speed and lessens the effect of drag and wind on the underside of the hull structure as the boat planes across the surface of the water.

The present invention may be used in larger boats having inboard motors. In such circumstances the boat may be provided with speed sensing flaps which actuate hydraulic cylinders to raise and lower the side panels. Other electrical and mechanical devices may also be used to sense the speed of the boat and to cause the side panels to be raised and lowered.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A boat with a variable configuration hull comprising: a hull structure having moveable hull section means moveable between a first position and a second position; drive means for moving said boat through the water; hull configuration control means operatively connected between said drive means and said hull section means for moving said moveable hull section means between said first and second positions; said boat further including mounting means, for supporting said drive means, pivotally secured to said hull structure and moveable between a first position and a second position; and wherein said control means includes connecting arm means secured at one end to said mounting means and at the other end to said moveable hull section means such that when said mounting means is moved from said first position to said second position said hull section means will also be moved from said first position to said second position.

2. The boat of claim 1 wherein said control means further includes means for biasing said mounting means to the first position.

3. The boat of claim 2 wherein said means for biasing said mounting means includes a spring like member extending between said mounting means and said hull structure.

4. The boat of claim 3 wherein said spring like member is a tension coil spring.

5. A method for collapsing and expanding the hull of a boat as the speed of the boat changes comprising:
(a) pivotally mounting a motor to a boat hull structure having at least two moveable hull sections that move between collapsed and expanded position such that said motor is moveable between a first position and a second position;
(b) operatively connecting said motor with said moveable hull sections such that when said motor moves from said first position to said second position said hull sections will also move between collapsed and expanded position;
(c) biasing said motor to said first position; and
(d) rotating said motor from said first position toward said second position causing said hull sections to move between said collapsed and expanded positions.

6. The method of claim 5 wherein said motor is an outboard motor and wherein said means for rotating said motor from said first position to said second position when said motor is actuated includes extending a propeller to a point below the axis of rotation of said motor.

7. Method of claim 5 wherein said step of pivotally mounting a motor to the boat hull structure includes securing said motor to a motor mount which is pivotally secured to said hull structure.

8. The method for collapsing and expanding the hull of a boat of claim 7 wherein said means for operatively connecting said motor to said hull section includes extending a pair of connecting arms from said motor mount to respective hull sections.

9. A boat with a variable volume primary hull whose volume, configuration and overall width is automatically controlled and varied by the speed of the boat moving through the water, comprising: a variable volume primary boat hull including a plurality of hull panel means and means for movably mounting thd hull panel means such that the hull panel means can be moved laterally back and forth for varying the volume, configuration and overall width of the primary hull itself; drive means mounted on said variable volume primary hull for powering the variable volume hull through the water and through a selected range of speeds; control means operatively interconnected between said drive means and said movable hull panel means and responsive to increases and decreases in speed of the variable volume primary hull as it moves through the water for varying the volume, configuration and overall width of the hull in relationship to speed changes of the hull as it moves through the water; said control means including means for (1) decreasing the volume and overall width of the hull in response to the speed of the hull increasing, and (2) increasing the volume and overall width of the hull in response to the speed of the hull decreasing; and wherein said control means include means for continuously controlling and varying the hull volume, configuration, and overall width over a selected range of hull speeds such that as the hull speed increases and decreases through the range the volume, configuration and overall width of the hull is continuously changing.

10. The variable volume boat hull and controls therefore of claim 9 wherein said hull panel means includes at least two separate hull panels movably mounted for back and forth movement; and wherein said control means includes an actuator assembly connected to both said hull panels for moving the same laterally back and forth to vary the volume, configuration and overall width of the hull as it moves through the water and as its speed increases and decreases.

11. The variable volume boat hull of claim 9 including mounting means for mounting said drive means to the hull; and wherein the hull panel means includes a keel panel and two side panels secured to opposite sides of the keel panel with the side panels being movably between a first position extending generally outwardly from the keel panel and a second position extending generally vertically from the keel panel.

12. The boat of claim 11 wherein said mounting means is pivotally secured to said keel panel so as to be moveable between a first position and a second position and wherein said control means includes a pair of connecting arms secured at one end to said mounting means and at the other end to respective side panels such that as said mounting means is moved from said first position to said second position said side panels will also be moved from said first position to said second position.

13. The boat of claim 12 wherein said control means further includes means for biasing said mounting means to the first position.

14. The boat of claim 13 wherein said means for biasing said mounting means includes a spring like member extending between said mounting means and said keel panel.

15. The boat of claim 14 wherein said spring like member is a tension coil spring.

16. The boat of claim 13 wherein said drive means includes an outboard motor having a propeller mounted to said movable mounting means and wherein said outboard motor is mounted on said movable mounting means relative to the boat such that the actuation of said outboard motor and the resulting thrust dictates that the mounting means will begin to move from said first position to said second position, and wherein the movement of said mounting means results in said side panels moving accordingly.

17. The boat of claim 13 wherein said drive means includes an outboard motor having a propellor mounted to said moveable mounting means and wherein the said outboard motor is mounted on said moveable mounting means relative to the boat such that the actuation of said outboard motor and the resulting thrust dictates that the mounting means will begin to move from said first position to said second position, and wherein the movement of said mounting means results in said moveable hull section means moving accordingly.

18. A method of automatically controlling and varying the volume, configuration, and overall width of a variable volume boat hull as it moves through the water comprising the steps of:
(a) forming a variable volume primary boat hull with a plurality of hull panel means;
(b) movably mounting the hull panel means such that the same can be moved laterally back and forth to vary the volume, configuration, and overall width of the hull;
(c) powering the variable volume boat hull through the water and through a selected range of speeds by drive means mounted on the boat hull;
(d) operatively interconnecting the drive means with the hull-panel means;
(e) effectively sensing the speed of the variable volume boat hull as it moves through the water;
(f) varying the volume, configuration, and overall width of the hull in relationship to speed changes of the hull as the hull moves through the water;
(g) the step of varying the volume, configuration, and overall width of the hull including the step of decreasing the volume and overall width of the hull in response to the speed of the hull increasing, and increasing the volume and overall width of the hull in response to the speed of the hull decreasing; and
(h) continuously controlling and varying the volume and overall width of the primary hull over a substantial hull speed range such that both the volume and overall width of the hull continuously changes as the speed of the hull increases and decreases.

* * * * *